United States Patent
Gramatikov et al.

(10) Patent No.: US 12,446,776 B2
(45) Date of Patent: Oct. 21, 2025

(54) COMPENSATING FOR POLARIZATION CHANGES INTRODUCED BY COMPONENTS WITH RETARDATION IN POLARIZATION-SENSITIVE RETINAL SCANNING SYSTEMS

(71) Applicant: THE JOHNS HOPKINS UNIVERSITY, Baltimore, MD (US)

(72) Inventors: Boris Gramatikov, Baltimore, MD (US); David Guyton, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 900 days.

(21) Appl. No.: 17/601,351

(22) PCT Filed: Apr. 6, 2020

(86) PCT No.: PCT/US2020/026840
§ 371 (c)(1),
(2) Date: Oct. 4, 2021

(87) PCT Pub. No.: WO2020/206414
PCT Pub. Date: Oct. 8, 2020

(65) Prior Publication Data
US 2022/0167845 A1    Jun. 2, 2022

Related U.S. Application Data

(60) Provisional application No. 62/829,307, filed on Apr. 4, 2019.

(51) Int. Cl.
*A61B 3/10* (2006.01)
*A61B 3/02* (2006.01)
(Continued)

(52) U.S. Cl.
CPC ............ *A61B 3/12* (2013.01); *A61B 3/102* (2013.01); *A61B 3/113* (2013.01); *A61B 3/14* (2013.01)

(58) Field of Classification Search
CPC ......... A61B 3/02; A61B 3/102; A61B 3/1025; A61B 3/1015; A61B 3/1225
(Continued)

(56) References Cited

U.S. PATENT DOCUMENTS 5,303,709 A * 4/1994 Dreher ................. A61B 3/1225
600/587
5,787,890 A    8/1998 Reiter et al.
(Continued)

OTHER PUBLICATIONS

Hunter, et al., "Mathematical modeling of retinal birefringence scanning," J Opt Soc Am A 16, 2103-2111 (1999).
(Continued)

*Primary Examiner* — Dawayne Pinkney

(57) ABSTRACT

An optical apparatus uses polarized light to interrogate birefringence properties of the retina to detect the fixation condition of the eye by sensing characteristic birefringence patterns of the retinal structures. Optical components, as well as optional additional components, interfere with the polarization measurements by introducing unwanted retardance which alters the polarization state of the light entering the eye and of the light reaching the detection system. Compensating retarders are provided to nullify the effect of unwanted retardance in the forward and return light paths so the polarization states of the light entering the eye and the light reaching the detection system are not contaminated by the effects of the unwanted retardance. Mueller matrices are used to mathematically calculate the parameters for the compensating retarders for the unwanted retardance. A variable retarder system may also be provided to compensate for the corneal birefringence of the eye via feedback control.

17 Claims, 1 Drawing Sheet

(51) Int. Cl.
*A61B 3/113* (2006.01)
*A61B 3/12* (2006.01)
*A61B 3/14* (2006.01)

(58) Field of Classification Search
USPC ....... 351/206, 200, 205, 210, 215, 221, 222, 351/246
See application file for complete search history.

(56) References Cited

U.S. PATENT DOCUMENTS

| | | | |
|---|---|---|---|
| 6,027,216 | A | 2/2000 | Guyton et al. |
| 6,356,036 | B1 | 3/2002 | Zhou |
| 8,678,592 | B2 | 3/2014 | Gramatikov et al. |
| 9,713,423 | B2 | 7/2017 | Irsch et al. |
| 10,004,397 | B2 | 6/2018 | Gramatikov et al. |
| 2004/0061834 | A1* | 4/2004 | Zhou .................. A61B 3/1005 351/215 |
| 2017/0014026 | A1* | 1/2017 | Guyton .................. A61B 3/14 |

OTHER PUBLICATIONS

Hunter, et al., "Automated detection of foveal fixation by use of retinal birefringence scanning," Appl Optics 38, 1273-1279 (1999).
Gramatikov, et al., "Birefringence-based eye fixation monitor with no moving parts," J Biomed Opt 11, 34025 (2006).
Irsch, et al., "Spinning wave plate design for retinal birefringence scanning," Proc Spie 7169(2009).
Irsch, et al., "Modeling and minimizing interference from corneal birefringence in retinal birefringence scanning for foveal fixation detection," Biomed Opt Express 2, 1955-1968 (2011).
Gramatikov, et al., "A device for continuous monitoring of true central fixation based on foveal birefringence," Ann Biomed Eng 41, 1968-1978 (2013).
Gramatikov, et al., "A no-moving-parts sensor for the detection of eye fixation using polarised light and retinal birefringence information. ," Journal of Medical Engineering & Technology (Taylor & Francis) 41, 249-256 (2017).
Azzam, et al., "Conventional and Generalized Mueller-Matrix Ellipsometry Using the 4-Detector Photopolarimeter," Opt Eng 30, 1583-1589 (1991).
Goldstein, "Mueller Matrix Dual-Rotating Retarder Polarimeter," Applied Optics 31, 6676-6683 (1992).
Hauge, et al., "Mueller Matrix Ellipsometry with Imperfect Compensators," Journal of the Optical Society of America 68, 1519-1528 (1978).
Gramatikov, et al., "Integrating Retinal Birefringence Scanning and Optical Coherence Tomography for Pediatric Retinal Imaging," Imaging and Applied Optics (2018).
Chia-Chi Liao, et al., "Analysis of Linear Anisotropic Parameters by Using Hybrid Model in Muller Optical Coherence Tomography." Advancement of Optical Methods in Experimental Mechanics. vol. 3. Proceedings of the 2014 Annual Conference on Experimental Mechanics., pp. 183-189.

\* cited by examiner

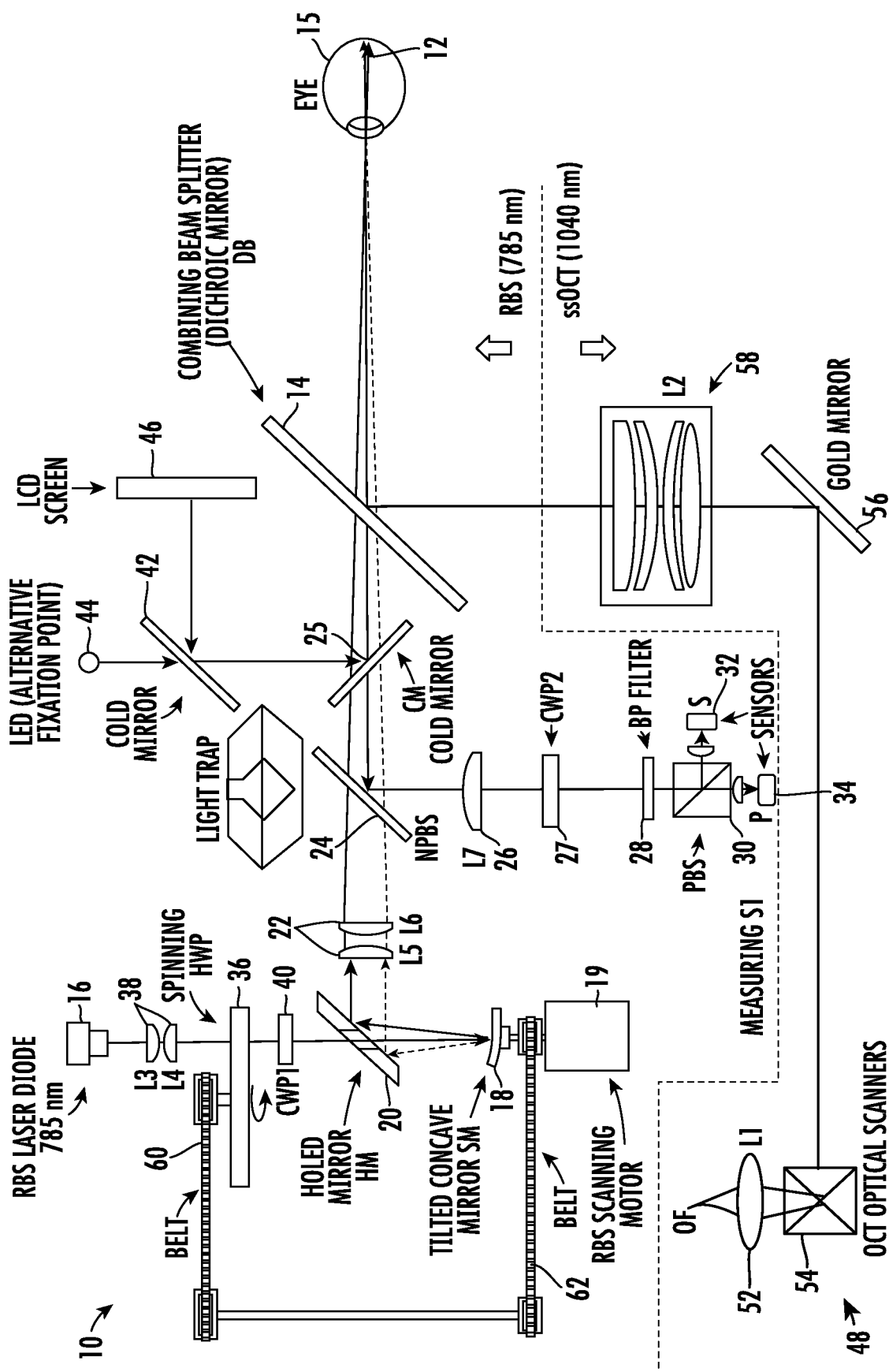

COMPENSATING FOR POLARIZATION CHANGES INTRODUCED BY COMPONENTS WITH RETARDATION IN POLARIZATION-SENSITIVE RETINAL SCANNING SYSTEMS

CROSS-REFERENCE TO RELATED APPLICATIONS

This application is a 35 U.S.C. § 371 U.S. national entry of International Application PCT/US2020/026840 having an international filing date of Apr. 6, 2020, which claims the benefit of U.S. Provisional Application No. 62/829,307, filed Apr. 4, 2019, the content of each of the aforementioned applications is herein incorporated by reference in their entirety.

FIELD OF THE INVENTION

The present invention relates generally to retinal imaging. More particularly, the present invention relates to compensating for polarization changes introduced by components with retardation in polarization-sensitive retinal scanning systems.

BACKGROUND OF THE INVENTION

In practical designs of polarization-sensitive systems, it is important to keep track of the polarization state of light along most beam paths. This can be done by using a Polarization Tracing Model. This formalism uses a train of Mueller matrices treating each polarization-altering element in the system as a retarder, where the retardation of the light beam is changed by transmission through, or reflection from, the polarization-altering element. Oftentimes, the designer needs to incorporate an optical element with unknown polarization behavior, such as a dichroic or cold mirror, metallic mirror, a dielectric beamsplitter at an angle, a general-purpose beamsplitter, etc. Each of these components can behave as a retarder with unknown Mueller matrix, retardance, and fast axis azimuth. The retardance that is added to the light beam can depend on the specific material, wavelength, temperature, angle of incidence, etc., which can necessitate measurement for the specific application. This added retardance is often unwanted, and, if so, these components need to be compensated for. That is, the differences in phase retardation introduced by them may need to be nullified as a whole, so that at a certain place in the system a desired polarization state of light exists and can be measured. The polarization state of light is described by the Stokes vector, consisting of four components, $S=[S_0, S_1, S_2, S_3]$.

It would therefore be advantageous to compensate for polarization changes introduced by components with retardation in polarization-sensitive retinal scanning systems. The method of the present invention is based on Mueller matrix measurements that can be performed with a polarimeter.

SUMMARY OF THE INVENTION

In accordance with an embodiment, the present invention provides an optical system using polarized light to interrogate birefringence properties of a retina of an eye in order to detect the fixation condition of the eye by sensing characteristic birefringence patterns of retinal structures. The system includes a source of polarized light and a double-pass imaging system to image the polarized light onto the retina and to capture the light reflected back. A scanning system is used to vary a location on the retina where the birefringence properties are interrogated. A detection system is used to analyze changes in a polarization state of the reflected light from the retina as a measure of the retinal birefringence amount and orientation. The system also includes an optical system. The optical system contains unwanted retardance, wherein the unwanted retardance can cause interference with polarization measurements which alters the polarization state of the light entering the eye and of the light reaching the detection system. A compensating retarder provided in each of the forward and return light paths nullifies an effect of the unwanted retardance in each of the forward and return light paths, so that polarization states of the light entering the eye and the light reaching the detection system are not contaminated by the effects of the unwanted retardance.

In accordance with an aspect of the present invention, the system includes a cold mirror, configured to introduce visible light from a fixation target into the eye. A compensating retarder in the forward path restores the polarization state reaching the eye to the polarization state at the beginning of the path, and a compensating retarder in the return path restores the polarization state reaching the sensors to the polarization state of the light exiting the eye. A dichroic beamsplitter is positioned as the last component between the optics and the eye. The dichroic beamsplitter is configured to introduce light from another imaging system into the eye. In addition to the dichroic beamsplitter, a compensating retarder is positioned in the forward path and restores the polarization state reaching the eye to the polarization state at the beginning of the path, and a compensating retarder is positioned in the return path to restore the polarization state reaching the sensors to the polarization state of the light exiting the eye.

In accordance with an aspect of the present invention, the compensating retarder in the input path can include a variable compensator module, which compensates for the corneal birefringence of the individual patient's eye in the forward path in addition to compensating for the retardances of the optical components in the forward path. The compensating retarder in the return path can also include a variable compensator module, which compensates for the corneal birefringence of the individual patient's eye in the return path in addition to compensating for the retardances of the optical components in the return path. The compensating retarder in each of the input and return paths compensates for unwanted retardance introduced only by those optical components that are unique to the respective path, and a variable compensator module is arranged in a double-pass configuration with those optical components that are common to both input and return paths, to compensate not only for the unwanted retardance introduced by those optical components that are common to both forward and return paths, but also to compensate via feedback control for the corneal birefringence of the individual patient's eye. The system can further include one selected from a group of a light emitting diode (LED) or a liquid crystal display (LCD) screen.

In accordance with another aspect of the present invention, a method for calculating a compensator for the system includes calculating a compensator for the forward path based on the measured Mueller matrix of the path as a whole, or all of its components taken separately. A method for calculating a compensator for the system also includes calculating a compensator for the return path based on the measured Mueller matrix of the path as a whole, or all of its components taken separately. The system can include a non-transitory computer readable medium.

In accordance with yet another aspect of the present invention, a method using polarized light to interrogate birefringence properties of a retina of an eye in order to detect the fixation condition of the eye by sensing characteristic birefringence patterns of retinal structures includes imaging the polarized light onto the retina and to capture the light reflected back using a double-pass imaging system. The method includes varying a location on the retina where the birefringence properties are interrogated using a scanning system and analyzing changes in a polarization state of the reflected light from the retina as a measure of the retinal birefringence amount and orientation using a detection system. The method includes accounting for interference with polarization measurements caused by unwanted retardance which alters the polarization state of the light entering the eye and of the light reaching the detection system using an optical system. The method also includes nullifying an effect of unwanted retardance in each of the forward and return light paths using a compensating retarder provided in each of the forward and return light paths such that polarization states of the light entering the eye and the light reaching the detection system are not contaminated by the effects of unwanted retardance.

In accordance with still another aspect of the present invention, the method includes introducing visible light from a fixation target into the eye using a cold mirror, wherein a compensating retarder in the forward path restores the polarization state reaching the eye to the polarization state at the beginning of the path, wherein a compensating retarder in the return path restores the polarization state reaching the sensors to the polarization state of the light exiting the eye. The method includes using a dichroic beamsplitter as a last component between the optics and the eye. The dichroic beamsplitter is configured to introduce light from another imaging system into the eye. A compensating retarder in the forward path restores the polarization state reaching the eye to the polarization state at the beginning of the path, wherein a compensating retarder in the return path restores the polarization state reaching the sensors to the polarization state of the light exiting the eye. The method includes compensating for the corneal birefringence of the individual patient's eye in the forward path in addition to compensating for the retardances of the optical components in the forward path using a variable compensator module. The method can also include compensating for the corneal birefringence of the individual patient's eye in the return path in addition to compensating for the retardances of the optical components in the return path using a variable compensator module. Additionally, the method includes compensating for unwanted retardance introduced only by those optical components that are unique to the respective path using the compensating retarder in each of the input and return paths, and compensating not only for the unwanted retardance introduced by those optical components that are common to both forward and return paths, but also compensating via feedback control for the corneal birefringence of the individual patient's eye using a variable compensator module arranged in a double-pass configuration with those optical components that are common to both input and return paths. The method can include calculating a compensator for the forward path based on the measured Mueller matrix of the path as a whole, or all of its components taken separately. The method also includes calculating a compensator for the return path based on the measured Mueller matrix of the path as a whole, or all of its components taken separately.

BRIEF DESCRIPTION OF THE DRAWINGS

FIG. 1 illustrates a schematic diagram of an exemplary polarization-sensitive retinal birefringence scanning system, according to an embodiment of the present invention.

DETAILED DESCRIPTION OF THE INVENTION

The presently disclosed subject matter now will be described more fully hereinafter with reference to the accompanying Drawing, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains, having the benefit of the teachings presented in the foregoing descriptions and the associated Drawing. Therefore, it is to be understood that the presently disclosed subject matter is not to be limited to the specific embodiments disclosed and that modifications and other embodiments are intended to be included within the scope of the appended claims.

In accordance with one or more embodiments, the present invention provides a system and method for improved retinal birefringence scanning. An optical apparatus uses polarized light to interrogate the birefringence properties of the retina of an eye in order to detect the fixation condition of the eye by sensing characteristic birefringence patterns of the retinal structures. The apparatus includes a source of polarized light, a double-pass imaging system to image the polarized light onto the retina and to capture the light reflected back from the retina, a scanning system to vary the location on the retina where the birefringence properties are interrogated, and a detection system to analyze changes in the polarization state of the reflected light from the retina as a measure of the retinal birefringence amount and orientation.

Optical components of the above system of the present invention, as well as optional additional components, interfere with the polarization measurements by introducing unwanted retardance which alters the polarization state of the light entering the eye and of the light reaching the detection system. Compensating retarders are provided to nullify the effect of unwanted retardance in the forward and return light paths so that the polarization states of the light entering the eye and the light reaching the detection system are not contaminated by the effect of the unwanted retardance.

FIG. 1 illustrates a schematic diagram of an exemplary polarization-sensitive retinal birefringence scanning system, according to an embodiment of the present invention. The schematic diagram of FIG. 1 describes a general optical diagram of a retinal birefringence scanning system 10 (not to scale). The basic idea of a retinal birefringence scanning system 10 is to scan the retinal area in the region of the fovea (the most sensitive part of the eye that the brain aims at the object of regard) with polarized light, and to analyze the light reflected from the fundus. The Henle fibers radiating out from the center of the fovea change the polarization state of light, which leads to acquisition of different signals, depending on the particular path on the retina that is being scanned, when using a polarization-sensitive system.

The system and method of the present invention are based on a property of the scanned object, in this case the retina 12 of the eye 15, to change the polarization state of light, i.e. birefringence, and include what is hence called retinal birefringence scanning (RBS). Light from a low-power laser 16, such as a laser diode, or more particularly, a near-infrared (NIR) laser diode, with a wavelength for example of 785 nm, is directed to a scanning mirror, for example a tilted concave scanning mirror SM (which can also be an XY scanner) 18. The SM 18 is rotated by scanning motor 19. In an exemplary embodiment of the present invention, the low-power laser 16 can emit light with a wavelength of 785 nm. The light that is reflected by the SM 18 has a polarization state that is almost entirely preserved due to the nearly normal angle of incidence. The reflected light is redirected towards the eye by a highly reflective mirror (typically with a gold or silver coating), with the light hitting the mirror at an incidence of substantially 45°. In FIG. 1, the highly reflective mirror takes the form of holed mirror, HM 20. After reflection by HM 20, the reflected light of the scanning beam travels through a lens system (here L5, L6) 22, a non-polarizing beamsplitter NPBS, 24, a cold mirror, 25, and a dichroic beamsplitter DB, 14, to reach the cornea and the crystalline lens of the eye, 15. The light is focused onto the retina 12 by the eye's own cornea and crystalline lens. The returning light is redirected by the NPBS, refocused, here by lens L7, 26, passed through a compensating waveplate (retarder) CWP2, 27, filtered by a narrow-band-pass filter BP, 28, and then separated into s- and p-components by a polarizing beamsplitter, PBS, 30, to reach the two sensors (one for the s- and one for the p-polarization components) 32, 34. The difference s–p is the birefringence scanning signal, which depends upon the location of the point being instantly scanned. In the case of circular scanning, the signal returned contains two main frequency components: $f_s$ and $2f_s$, ($f_s$ being the scanning frequency) where increased $f_s$ power indicates off-central fixation, and increased $2f_s$ power indicates central fixation (at the center of the scanning circle).

In an attempt to reduce the influence of the corneal birefringence, a spinning half-wave plate (HWP), 36, can be used (HWP in the diagram in FIG. 1). The HWP 36 rotates the orientation of the axis of the polarization of the original linear polarized light at a certain speed, which causes different frequency signatures to be detected in the output signal, thus enabling a procedure called phase-shift subtraction, helping to reduce the instrumental noise. Light can be passed through lenses L3 and L4, 38, before reaching the spinning HWP, 36. Light exiting the spinning HWP can also be passed through a compensating waveplate (retarder) CWP1, 40, before reaching the SM 18. Some designs require the introduction of a fixation target by means of a cold mirror, 25, which in the case of FIG. 1 allows introducing the light from a red fixation LED, 44, and/or from a small video screen (LCD, 46, in FIG. 1), particularly for use with pediatric patients, into the combined RBS system 10. Cold mirror CM, 42, further combines the light from fixation LED 44 and from LCD video screen 46. Belts 60 and 62 facilitate rotation of components such as the HWP 36 and the SM 18.

In some designs it is also necessary to combine the RBS system 10 with another retinal imaging system, for instance with an optical coherence tomography (OCT) system 48 shown in the lower part of FIG. 1. The OCT system in this embodiment includes a 1040 nm light source introduced by optical fiber OF, 51, lens L1, 52, OCT optical scanners 54, a gold mirror, 56, and a lens L2, 58. Finally, the combining dichroic beamsplitter, DB, 14, passes one wavelength (RBS wavelength, 785 nm here) and reflects another wavelength (OCT, 1040 nm here) towards the eye.

In FIG. 1, there are several system components that act as retarders and can change the polarization state of the measuring light. These are: the holed mirror (HM), the non-polarizing beamsplitter (NPBS), the cold mirror (CM), and the dichroic beamsplitter (DB). Three of these components are used in both the forward path and in the return path. This means that the spinning, linearly polarized light after the HWP will not only have been rendered elliptical when reaching the eye, but its ellipticity will also be changing, depending on the axis of polarization of the original linear polarized light, the instant position of the spinning HWP, and the instant position of the scanning mirror SM. This is a major problem which can occur with any RBS system, even without the use of a combining beamsplitter DB, 14. Combining RBS with other technologies by using DB, 14, makes it even more challenging. It should be pointed out that while the companion system may not be polarization-sensitive (as is the case with the OCT), the RBS system is, and any attempt to combine it with something else (i.e. for monitoring central fixation) will fail if the retardation properties of the RBS components are not taken into account.

In the case of the system of FIG. 1, the dichroic beamsplitter DB, 14, used to combine the two systems can greatly affect the polarization state to the extent that system performance will be greatly compromised. Using just the cold mirror CM 25 will have essentially the same effect, as would any added waveplate with retarder behavior, not shown in the diagram. This could be a mirror, beamsplitter, filter, prism, lens coating, mirror protective coating, etc.

Therefore, optical compensation for a single retarder, or a series of retarders, can be designed using a Mueller matrix representation. A complete and general polarimetric characterization of any retarder is described by the 4×4 Mueller matrix. Let the Mueller matrix for a polarization-altering device (retarder) R be $$M_R = \begin{pmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{pmatrix} \quad (1)$$

A series of several retarders can be represented using the Mueller formalism as a train of matrices. In the example of FIG. 1, the forward path after the scanning mirror and up until the eye would be represented as:

$$M_{Rf} = M_{GM} M_{NPBSt} M_{CM} M_{DB} \quad (2)$$

where $M_{GM}$ stands for the gold mirror, $M_{NPBSt}$ stands for the non-polarizing beamsplitter in transmission mode, $M_{CM}$ represents the cold mirror CM 25 in transmission mode, and $M_{DB}$ stands for the dichroic beamsplitter in transmission mode. Each of these retarders' Mueller matrix can be measured separately using known polarimetric (ellipsometric) methods. Alternatively, all components can be measured together, in line in their mounted positions, using the same polarimetric methods.

Similarly, the train of retarders in the return path can be represented as:

$$M_{Rr} = M_{DB} M_{CM} M_{NPBSr} \quad (3)$$

where $M_{NPBSr}$ is the non-polarizing beamsplitter in reflection mode. The retardance of the narrow-band-pass filter BP can be considered negligible.

In the general case, the retarder R from equation (1) will change the polarization state of the light, such that the Stokes vector S' at the output (transmitted or reflected) of the retarder will not be the same as the one at the input S, that is, S'≠S:

$$S' = M_R S \quad (4)$$

which means that $M_R$ is changing the polarization state of the light. Assume the polarization state S' of the exiting beam needs to be returned to the same state as the incident light, S. Mathematically, a compensating retarder with a Mueller matrix $M_C$ is needed, which will undo the changes introduced by R, whose Mueller matrix is $M_R$ (and can be measured):

$$S = M_C S' = M_C M_R S \quad (5)$$

This can be achieved when $M_C M_R$ satisfies:

$$M_C M_R = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad (6)$$

$$\text{or } M_C = M_R^{-1} \quad (7)$$

where $^{-1}$ denotes matrix inversion. Because of (6), and since matrix multiplication is associative, one can rewrite (5) also as $$S = M_C \cdot M_R \cdot S = M_R \cdot M_C \cdot S \quad (8)$$

The above equation means that the same compensation can be achieved with the compensator placed after (post-compensation), as with the compensator placed before the retarder R (pre-compensation). This has significant practical implications. It should also be mentioned that compensation can be achieved regardless of the polarization state S of the incident light. The latter can be linear, circular, or elliptical, at any orientation of the polarization.

The compensation in the forward path is done with the compensating waveplate (retarder) CWP1, which can be used either as a pre-compensator, or a post-compensator. In the case of the design shown in FIG. 1, using the compensating waveplate as a post-compensator (i.e. between the dichroic beamsplitter DB and the eye) would not be suitable because the compensating waveplate would have to be very large, comparable to the sizes of the cold mirror CM and the dichroic beamsplitter DB. So CWP1 is used as a pre-compensator, at the beginning of the forward path, as shown in FIG. 1. Its Mueller matrix is calculated according to equations (2) and (7) as:

$$M_{CWP1} = M_{Rf}^{-1} = (M_{GM} M_{NPBSr} M_{CM} M_{DB})^{-1} \quad (9)$$

where $^{-1}$ denotes matrix inversion. The matrix $M_{CWP1}$ fully describes the compensator in the forward path. After adding CWP1, the polarization state of the light at the end of the forward path (at the eye) will be identical to the polarization state of the light at the beginning of the path. In the case of FIG. 1 this will be linearly polarized light at any orientation, exiting the spinning HWP. In other designs, this can also be circular polarized light, or any elliptical light.

The compensation in the return path is done with the compensating waveplate (retarder) CWP2, which can also be used either as a pre-compensator, or a post-compensator. In the case of the design shown in FIG. 1, using it as a pre-compensator (i.e. between the dichroic beamsplitter DB and the eye) would not be suitable, again, because the compensating waveplate would have to be very large, comparable to the sizes of the cold mirror CM and the dichroic beamsplitter DB. So CWP2 is used here as a post-compensator, at the end of the return path. Its Mueller matrix is calculated according to equations (3) and (7) as:

$$M_{CWP2} = M_{Rr}^{-1} = (M_{DB} M_{CM} M_{NPBSr})^{-1} \quad (10)$$

where $^{-1}$ denotes matrix inversion. The matrix $M_{CWP2}$ fully describes the compensator in the return path. After adding CWP2, the polarization state of light at the end of the return path (before the polarizing beamsplitter and the sensors) will be identical to the polarization state of light at the beginning of the path, which is right after exiting the eye. In the case of FIG. 1 this will typically be light with elliptical polarization, the preservation of the polarization state of which is crucial for the proper functioning of the system.

Both $M_{CWP1}$ and $M_{CWP2}$ can be calculated, for any fast axis orientation of the retarders participating in the train to be compensated.

The compensators CWP1 and CWP2, as calculated by means of equations (9) and (10) respectively, do compensate for the retardances of the optical components in the forward and return paths respectively, but do not compensate for the retardance introduced by the corneal birefringence (the retardance that occurs when the light passes through the cornea in both the forward and return light paths). In contrast to the retinal retardance, which depends on the point on the retina being scanned and thus varies as the scan progresses, the corneal retardance stays relatively constant. But it varies across the population in terms of both fast axis orientation and retardation, and its magnitude of retardation can be several times higher than that of the retina.

It is possible to partially or fully compensate for unwanted retardance introduced by the corneal birefringence in the individual eye. One way is via ellipsometry. With respect to the present invention, for example, the compensator CWP2 is replaced by a variable compensator module, variable in retardance as well as in orientation of the fast axis. For example, this variable compensator module may be comprised of a rotatable Babinet compensator which is changed in retardance by the relative overlap of two birefringent plates and in orientation of the fast axis by rotation of the entire compensator about the optical axis. A second example of a variable compensator module may be a pair of counter-rotating waveplates with equal retardances whereby the amount of counter-rotation may be varied under stepper motor control, and the combined retardance of the two counter-rotating waveplates can thus be varied from zero to twice the retardance of each waveplate. The entire module may be mechanically rotated about the optical axis using stepper motor or solenoid control to vary the orientation of the fast axis of the compensator module. A third example of a variable compensator module, at least in other embodiments without continuously spinning polarization, may be the combination of a Liquid Crystal Variable Retarder (LCVR) and a Liquid Crystal Polarization Rotator (LCPR), both electrically controlled, such as, for example, (Meadowlark LCVR part #D11185 and LCPR part #D11189). The feedback operation of each of these variable compensator modules will be illustrated using the liquid crystal compensator module. A base retardation is programmed on the LCVR, matching the retardation of the $M_{CWP2}$ of equation (10) plus the minimum possible corneal retardance. A base rotation angle is set to the LCPR, matching the azimuth of the $M_{CWP2}$ rotated by the minimum azimuth of the fast axis of the corneal birefringence. Once data acquisition starts, the computer program controlling the device calculates a quality index, i.e. the sum of the amplitudes characteristic of central fixation and of para-central fixation, and changes in real time the retardance and azimuth of the variable compensator module until the index is maximized. This would indicate optimal compensation in the entire return path, because the return signal, after reflection from tissues deep to the retinal nerve fibers, will depend entirely on the retinal nerve fiber birefringence's changing the polarization as the scan progresses, without interference from unwanted instrumental retardance in the return path or from the retardance introduced by the corneal birefringence in the return path.

In other embodiments the compensator CWP1 is replaced by a variable compensator module, variable in retardance as well as in orientation of the fast axis. This is used in a like manner as described above but for optimal compensation of the unwanted instrumental retardance in the forward path and from the retardance introduced by the corneal birefringence in the forward path.

Complete feedback compensation for the corneal birefringence requires compensation in both the forward and the return paths. This may be accomplished with a single variable compensator module that will function in double-pass mode placed in the portions of the forward and return optical paths that are shared in a double-pass configuration. In the optical system of FIG. 1, for example, the optical components that are shared by both the forward and return paths are the cold mirror CM, the dichroic beamsplitter DB, and the corneal birefringence of the Eye. A variable compensator module capable of functioning in a double-pass mode (such as the variable Babinet compensator module or the counter-rotating waveplate module described above) is therefore placed between the non-polarizing beamsplitter NPBS and the cold mirror CM. The fixed compensating waveplate CWP1 will still be needed to compensate for unwanted retardance introduced by holed mirror HM and by the transmission mode of non-polarizing beamsplitter NPBS. The fixed compensating waveplate CWP2 will still be needed to compensate for any significant unwanted retardance introduced by the reflection mode of non-polarizing beamsplitter NPBS. With this configuration, upon feedback adjustment of the double-pass compensation similar to the feedback optimization as described above, unwanted instrumental retardance in the forward path will be compensated as well as the retardance introduced by the corneal birefringence in the forward path, resulting in light with spinning linear polarization striking the retinal nerve fibers, being optimally changed by the double passage through the retinal nerve fibers, and reaching the detectors in the return path without interference from either the retardance introduced by the corneal birefringence in the return path or by the unwanted instrumental retardance in the return path.

Anderson, Zhou, and Papworth, in U.S. Pat. No. 6,704,106 B2, entitled "Method and system for canceling system retardance error in an ophthalmological polarimeter," claim a mathematical method for cancelling the effects of internal birefringence errors in a clinical polarimeter designed to interrogate the birefringence properties of the retina of an eye.

They state (col 4, lines 28-31) that "each of the optical system elements may introduce [optical retardance errors] contributing to a residual system birefringence in the diagnostic optical path, which may contribute to a significant measurement error."

The most significant birefringent element in their optical system is a rotating half wave plate used to rotate the plane of linear polarization of their measuring beam of light during data acquisition. They state that an error of only 2.5 nm in the manufactured retardance of this half wave plate (typically having a total retardance of 390 nm) can cause significant measurement errors. They have therefore devised a procedural and mathematical method to cancel out the effect of such errors in the "system birefringence" of their apparatus. They provide numerical data showing that they can indeed cancel out the effects of inaccuracy of the retardance of the rotating half wave plate, but they do not provide such data showing that their method can cancel out the effects of unwanted retardance in non-rotating optical elements in their system such as beam splitters and mirrors.

With the apparatus of U.S. Pat. No. 6,704,106 B2, a differential measurement of the $S_1$ component of the polarization state of the light as it has been changed by double passage into and out of the eye being examined is obtained. Starting with the same linearly polarized light as these inventors, Poincaré sphere analysis shows that a half wave plate of the exactly correct retardance generates no error signal when the half wave plate is rotated. But, on the other hand, if the only retardance error in the system is from inaccurate retardance of the half wave plate, rotation of the half wave plate will generate an error signal varying in a sinusoidal manner, completing 1 full cycle for each 180-degree rotation of the half wave plate. But if the half wave plate's retardance is exactly correct, and the only retardance error in the system is from a non-rotating optical element such as a beam splitter or mirror adding unwanted linear retardance, rotation of the half wave plate generates an error signal varying in a sinusoidal manner that completes 2 full cycles with 180 degrees of rotation of the half wave plate.

A periodic signal containing two frequencies can be processed in various ways to eliminate one of those frequencies (as illustrated by examples in U.S. Pat. No. 9,713,423 B2). The inventors of U.S. Pat. No. 6,704,106 B2 have devised one method for eliminating the error signal generated from inaccurate retardance of their rotating half wave plate. But in the system of our present invention, the error signal from rotation of a correct half wave plate in the presence of unwanted linear retardance in the instrument is in the same form as one of the signals obtained from the linear retardance of the retinal nerve fibers, so this error signal cannot be eliminated without also eliminating a desired signal from the retinal nerve fibers. Any fixed linear retardance in the measuring instrument will therefore interfere erroneously with the desired signal from the birefringent retinal elements unless otherwise compensated.

It appears therefore that the inventors of U.S. Pat. No. 6,704,106 B2 may have been successful in devising a method to eliminate error from inaccurate retardance of their rotating half wave plate, but they present no evidence for their claimed elimination of the effects of other sources of system birefringence. Further, they do not contemplate using Mueller matrices in order to calculate the parameters for a compensating waveplate for the errors due to retardance, as described herein.

It will be understood by those with skill in the art that the polarization-related changes recorded in the process of eye fixation monitoring can provide valuable information regarding the presence or progression of various forms of eye disease or aging processes that affect the fovea or other retinal areas.

The control of the present invention can be carried out using a computer, non-transitory computer readable medium, or alternately a computing device or non-transitory computer readable medium incorporated into the device of the present invention. A non-transitory computer readable medium is understood to mean any article of manufacture that can be read by a computer. Such non-transitory computer readable media includes, but is not limited to, a flash drive (i.e. USB or SD stick), magnetic media, such as a floppy disk, flexible disk, hard disk, reel-to-reel tape, cartridge tape, cassette tape or cards, optical media such as CD-ROM, writable compact disc, magneto-optical media in disc, tape or card form, and paper media, such as punched cards and paper tape. The computing device can be a special computer designed specifically for this purpose. The computing device can be unique to the present invention and designed specifically to carry out the method of the present invention. An operating console for the device can take the form of a non-generic computer specifically designed by the manufacturer. It can be an embedded system, including a microcontroller. Additionally, the console computer can carry out communications through the execution of proprietary custom-built software that is designed and written by the manufacturer for the computer hardware specifically to operate the hardware.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An optical system using a polarized light to interrogate birefringence properties of a retina of an eye in order to detect a fixation condition of the eye by sensing characteristic birefringence patterns of retinal structures, comprising:
    a source of polarized light configured to emit the polarized light;
    a double-pass imaging system to image the polarized light onto the retina and to capture a reflected light;
    a scanning system to vary a location on the retina where the birefringence properties are interrogated;
    a detection system wherein the detection system comprises a sensor, wherein the sensor is configured to detect polarization components, wherein the detection system is configured to analyze changes in a polarization state of the detected polarization components of the reflected light from the retina as a measure of an amount and an orientation of the retinal birefringence, and wherein the detection system is configured to determine the fixation condition of the eye based on the polarization state,
    an optical system, wherein the optical system contains unwanted retardance, wherein the unwanted retardance can cause interference with polarization measurements which alters a polarization state of the polarized light entering the eye and of the reflected light reaching the detection system; and,
    a compensating retarder provided in each of a forward and a return light path to nullify an effect of the unwanted retardance in each of the forward and return light paths so that polarization states of the polarized light entering the eye and the reflected light reaching the detection system are not contaminated by the effects of the unwanted retardance.

2. The system of claim 1, further comprising a cold mirror, configured to introduce visible light from a fixation target into the eye, wherein a compensating retarder in the forward path restores the polarization state reaching the eye to the polarization state at the beginning of the path, wherein a compensating retarder in the return path restores the polarization state reaching the sensors to the polarization state of the light exiting the eye.

3. The system of claim 1, further comprising a dichroic beamsplitter as the last component between the optics and the eye, configured to introduce light from another imaging system into the eye, wherein a compensating retarder in the forward path restores the polarization state reaching the eye to the polarization state at the beginning of the path, wherein a compensating retarder in the return path restores the polarization state reaching the sensors to the polarization state of the light exiting the eye.

4. The system of claim 1, where the compensating retarder in the input path also comprises a variable compensator module, which compensates for the corneal birefringence of the individual patient's eye in the forward path in addition to compensating for the retardances of the optical components in the forward path.

5. The system of claim 1, where the compensating retarder in the return path also comprises a variable compensator module, which compensates for the corneal birefringence of the individual patient's eye in the return path in addition to compensating for the retardances of the optical components in the return path.

6. The system of claim 1, where the compensating retarder in each of the input and return paths compensates for unwanted retardance introduced only by those optical components that are unique to the respective path, and a variable compensator module is arranged in a double-pass configuration with those optical components that are common to both input and return paths, to compensate not only for the unwanted retardance introduced by those optical components that are common to both forward and return paths, but also to compensate via feedback control for the corneal birefringence of the individual patient's eye.

7. The system of claim 1 further comprising one selected from a group consisting of a light emitting diode (LED) or a liquid crystal display (LCD) screen.

8. A method for calculating a compensator for the system of claim 1 further comprising calculating a compensator for the forward path based on the measured Mueller matrix of the path as a whole, or all of its components taken separately.

9. A method for calculating a compensator for the system of claim 1 further comprising calculating a compensator for the return path based on the measured Mueller matrix of the path as a whole, or all of its components taken separately.

10. A method using polarized light to interrogate birefringence properties of a retina of an eye in order to detect a fixation condition of the eye by sensing characteristic birefringence patterns of retinal structures, comprising:
   imaging the polarized light onto the retina and to capture the light reflected back using a double-pass imaging system;
   varying a location on the retina where the birefringence properties are interrogated using a scanning system;
   analyzing changes in a polarization state of the reflected light from the retina as a measure of the retinal birefringence amount and orientation using a detection system,
   accounting for interference with polarization measurements caused by unwanted retardance, which alters the polarization state of the light entering the eye and of the light reaching the detection system using an optical system;
   nullifying an effect of unwanted retardance in each of the forward and return light paths using a compensating retarder provided in each of the forward and return light paths such that polarization states of the light entering the eye and the light reaching the detection system are not contaminated by the effects of unwanted retardance; and,
   determining the fixation condition of the eye based on the polarization state of the light entering the eye as detected by the detection system.

11. The method of claim 10 further comprising introducing visible light from a fixation target into the eye using a cold mirror, wherein a compensating retarder in the forward path restores the polarization state reaching the eye to the polarization state at the beginning of the path, wherein a compensating retarder in the return path restores the polarization state reaching the sensors to the polarization state of the light exiting the eye.

12. The method of claim 10, further comprising using a dichroic beamsplitter as a last component between the optics and the eye, wherein the dichroic beamsplitter is configured to introduce light from another imaging system into the eye, wherein a compensating retarder in the forward path restores the polarization state reaching the eye to the polarization state at the beginning of the path, wherein a compensating retarder in the return path restores the polarization state reaching the sensors to the polarization state of the light exiting the eye.

13. The method of claim 10, compensating for the corneal birefringence of the individual patient's eye in the forward path in addition to compensating for the retardances of the optical components in the forward path using a variable compensator module.

14. The method of claim 10, compensating for the corneal birefringence of the individual patient's eye in the return path in addition to compensating for the retardances of the optical components in the return path using a variable compensator module.

15. The method of claim 10, compensating for unwanted retardance introduced only by those optical components that are unique to the respective path using the compensating retarder in each of the input and return paths, and compensating not only for the unwanted retardance introduced by those optical components that are common to both forward and return paths, but also compensating via feedback control for the corneal birefringence of the individual patient's eye using a variable compensator module arranged in a double-pass configuration with those optical components that are common to both input and return paths.

16. The method of claim 10 further comprising calculating a compensator for the forward path based on the measured Mueller matrix of the path as a whole, or all of its components taken separately.

17. The method of claim 10 further comprising calculating a compensator for the return path based on the measured Mueller matrix of the path as a whole, or all of its components taken separately.

* * * * *